United States Patent [19]

Strohacker

[11] Patent Number: 5,526,472
[45] Date of Patent: Jun. 11, 1996

[54] METHOD AND SYSTEM FOR REPRESENTING A BIT PATTERN FOR UTILIZATION IN LINEAR OR CIRCULAR SHIFT OPERATION

[75] Inventor: Oscar C. Strohacker, Dripping Springs, Tex.

[73] Assignee: International Business Machines Corporation, Armonk, N.Y.

[21] Appl. No.: 320,088

[22] Filed: Oct. 7, 1994

[51] Int. Cl.⁶ ........................................ G06T 3/00
[52] U.S. Cl. ..................... 395/137; 395/133; 395/162
[58] Field of Search ........................ 395/137, 133, 395/162–166; 364/DIG. 1, DIG. 2; 345/153–155, 189–191, 196–198; 382/232, 250

[56] References Cited

U.S. PATENT DOCUMENTS 5,379,356  1/1995  Purcell et al. .................. 382/250

Primary Examiner—Almis R. Jankus
Attorney, Agent, or Firm—L. Bruce Terry; Andrew J. Dillon

[57] ABSTRACT

A method and system in a data processing system for efficiently rotating a linear bit pattern, wherein the data processing system includes a register for efficiently performing a rotate operation on a portion of the linear bit pattern, where such a portion has a selected number of bits. The linear bit pattern is divided into a plurality of pattern groups, where each of such pattern groups has a number of bits equal to a group length. Thereafter, a matrix of bits is formed. Such a matrix has groups of bits along a plurality of rows and columns, wherein each row contains a number of bits equal to a shift operand length, and each column contains a number of bits equal to the group length. Bits in a selected row are rotated. Thereafter, each row, as a group of bits, is rotated such that bits in each column remain in the same column. After manipulating the matrix, the contents of the matrix represents the linear bit pattern rotated by one bit.

12 Claims, 10 Drawing Sheets

```
            WORD 3       WORD 2       WORD 1       WORD 0      CARRY step 1    15 14 13 12   11 10 9 8    7 6 5 4     3 2 1 0        15 step 2    15 14 13 12   11 10 9 8    7 6 5 4     2 1 0 15       3 step 3    15 14 13 12   11 10 9 8    6 5 4 3     2 1 0 15       7 step 4    15 14 13 12   10 9 8 7     6 5 4 3     2 1 0 15       11 step 5    14 13 12 11   10 9 8 7     6 5 4 3     2 1 0 15
```

```
int i;
unsigned b,c, pat[NWORDS];

b = pat[NWORDS-1] >> (NBITS-1);
    for(i=0;i<NWORDS;i++)
    {
        c = pat[i] >> (NBITS-1);
        pat[i] = (pat[i] << 1)| b;
        b = c;
    }
```

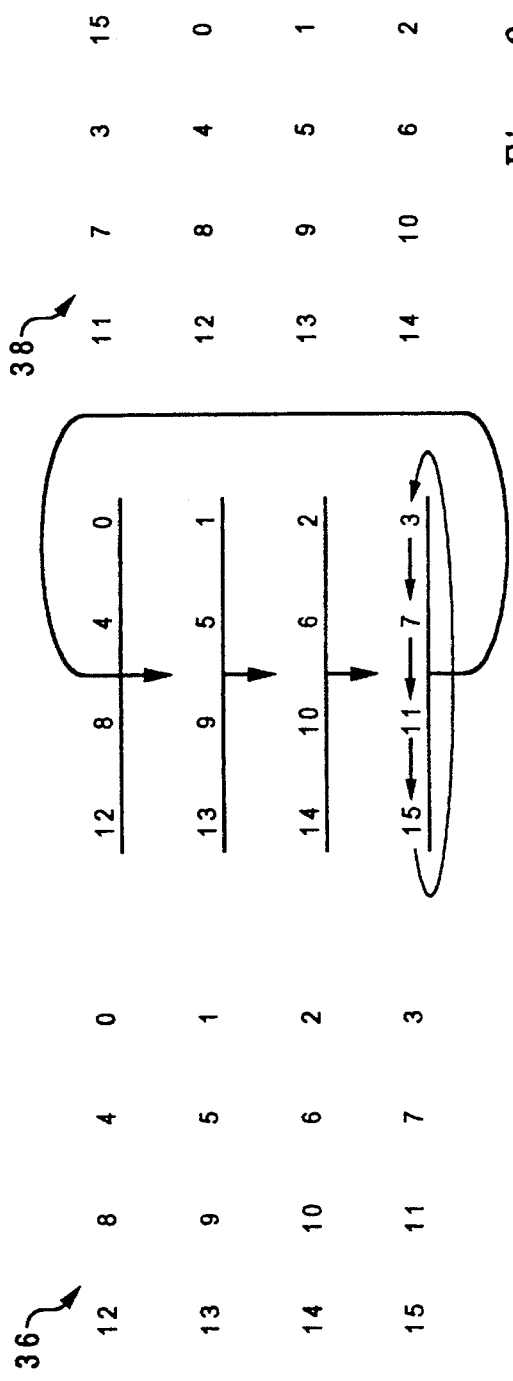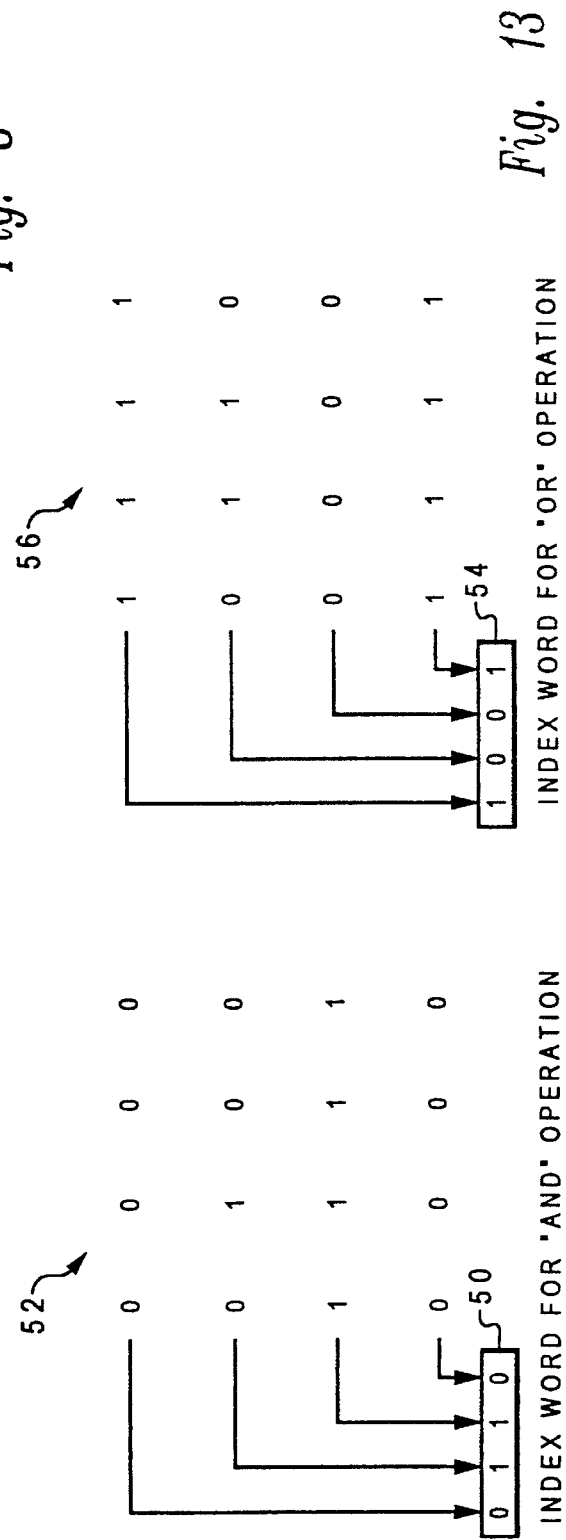

```
/* C language representation of 1 bit left long rotate of toridal shift reg. */ int bp;                        /* pointer to first word of pattern */
unsigned   pat[NWORDS];
#define  lrot1(a)  ((a<<1) | (a>>(NBITS-1)))  /* 1 instruction: left rot 1 bit:
                                                  arg must be unsigned */

/* Do the shift */ bp = (bp-1) % NWORDS;              /* decrement base pointer mod NWORDS */
    pat[bp] = lrot1(pat[bp]);  /* rotate word under new base pointer */
```

Fig. 12

```
/* C subroutine to perform A = A AND B,                              */
/* between AND-indexed toroidal shift registers A and B              */
/* where A shifts and has base pointer Abaseptr,                     */
/* B does not shift so has conceptual base pointer of 0.             */
unsigned  int
tsbm_and(A, Aindex, B, Bindex, Abaseptr)
unsigned  int  A[],B[];
unsigned  int  Aindex, Bindex;
int   Abaseptr;
{
unsigned  register  int  possible;
unsigned  register  newhits;
unsigned  register  b,r,np;
unsigned int ai,bi;   /* word index into arrays A and B resp. */ newhits = 0;
        possible = Aindex & Bindex;
        do {
                /* return bit index of first ONE */
            bi = first_set_bit(possible);  /* one or two CPU instructions*/ b = 1<<bi;   /* one cpu instruction */
               /* Apply base pointer offset to A since it shifts. */
            ai = (bi + Abp) % NWORDS;  /* two cpu instructions */
            if( np = A[ai] & B[bi] ){
                newhits |= b;
/*      This routine does "lazy" store to A: does not bother to store
        to A if index bit is zero, since word will never again be
        referenced if its index bit is zero */
                A[ai] = np;
                }
            }
        while( possible &= ~b);
        return  newhits;
}
```

Fig. 14

```
/* Optimised pattern rotate of AND-indexed toroidal shift register */ define lrot1(a) ((a<<1) | (a>>(NBITS-1))) /* 1 instruction: left rot 1 bit:
                                              arg must be unsigned */
register unsigned r,Ai;
      Abp = (Abp-1)%NWORDS;/* for NWORDS power of 2, single instruction */
                 /* rotate AND-index for A */
      Ai = lrot1(Ai)    /* single CPU instruction */
      if( Ai & 1)
            A[Abp] = lrot1(A[Abp]);
```

Fig. 15

METHOD AND SYSTEM FOR REPRESENTING A BIT PATTERN FOR UTILIZATION IN LINEAR OR CIRCULAR SHIFT OPERATION

BACKGROUND OF THE INVENTION

1. Technical Field

The present invention relates in general to a method and system for manipulating a long bit pattern, and in particular to a method and system of transforming a long bit pattern into a matrix having rows and columns of bits. Still more particularly, the present invention relates to transforming a long bit pattern into a matrix having rows and columns of bits, and manipulating such a matrix to perform the equivalent of a rotate operation on such a long bit pattern.

2. Description of the Related Art

Many software algorithms and hardware products utilize conceptual linear or circular shift registers or stacks of bits. Examples of such algorithms include non repeating and/or pseudo random sequence generation utilizing shift registers with feedback. Such sequence generation is used in applications such as calculating CRCs, cipher and signature generation, real-time signal processing, spread spectrum communications, and Monte Carlo modeling. Another use for linear or circular shift registers is for calculating history bit patterns in sliding window data compression. Still other applications for linear or circular shift registers include modeling hardware which incorporates long shift registers, and in pattern recognition applications.

In current software practice, it is taken for granted that multiword bit shift registers are represented in a computer as a linear array of addressable units (words). When the multiword bit patterns are interpreted as integers, this is the order which is convenient for performing multiple precision integer arithmetic. Many modern CPU construction sets include instructions to facilitate the shift or rotation of multi-word bit patterns consisting of a linear array of machine words. One example of such a CPU is the CPU sold under the trademark "RS6000" by IBM Corporation. By repeating machine word shift instructions, a long shift operation or long rotate operation may be synthesized. For example, on a left long shift, all bits but the leftmost bit of a minimum addressable unit or word are moved one position to the left, except that the leftmost bit of a given word is placed into the rightmost bit of the next word. And for a right long shift, the operation described above is reversed. To operate such a linear array of machine words as a linear queue, or FIFO (First-in, First-Out), new bits may be put into the rightmost bit for a left long shift and removed from the leftmost bit. For a right long shift, new bits are entered on the left and removed on the right. When data is entered and removed from the same end of the data structure, such a data structure is usually referred to as a "stack." In a circular operation, the leftmost bit of the leftmost word is considered to be adjacent to the rightmost bit of the rightmost word. In the case of circular operations, the long shift operations described above become long rotate operations.

FIG. 1 illustrates a rotate left operation which is performed on a 16-bit bit pattern that is stored in four 4-bit words. To simplify this example, a CPU that can perform a 4-bit rotate operation is utilized. That is, the CPU has a shift operand length of 4 bits. Thus, to perform a rotate left operation on four 4-bit words, the CPU must perform a series of shift operations on the 4-bit operands in order to make the bit pattern 20 of FIG. 1 into bit pattern 22. Such a series of shift operations is illustrated in the steps of FIG. 2.

In some figures in this disclosure, bit locations, in either a word or a register, are illustrated by a box. These bit locations are utilized to store either a "1" or a "0." Numerals within the boxes, however, indicate a reference numeral assigned to a particular bit in a bit pattern. Such numerals are not stored in the bit locations. Reference numerals are used in the examples to illustrate what happens to a particular bit in the bit pattern from one step in the process to another.

FIG. 2 illustrates the conventional steps for executing a 1-bit left rotate of a 16-bit bit pattern composed of four 4-bit words. Such a process is illustrated here as five steps. However, those persons skilled in the art should recognize that several machine instructions may be necessary to manipulate the bits in one step to resemble the bits in a subsequent step.

In step 1, the leftmost bit of WORD 3, bit-15, is copied to the CARRY bit location. In step 2, WORD 0 has been shifted left, with the CARRY bit placed in the rightmost bit of WORD 0, and the leftmost bit of WORD 0 placed into the CARRY bit. In step 3, WORD 1 has been shifted left, with the CARRY bit placed in the rightmost bit of WORD 1, and the leftmost bit of WORD 1 placed into the CARRY bit. In step 4, WORD 2 has been shifted left, with the CARRY bit placed in the rightmost bit of WORD 2, and the leftmost bit of WORD 2 placed in the CARRY bit. And finally, in step 5, WORD 3 has been shifted left, with the CARRY bit placed in the rightmost bit of WORD 3.

Those persons skilled in the art will appreciate that as more bits are added to the bit pattern, the number of steps to perform a rotate on such a bit pattern increases proportionately.

In FIG. 3, there is a sequence of C-language instructions to perform the 1-bit left rotate as illustrated in FIGS. 1 and 2. In this code, there is a "DO-loop" which is executed a number of times proportional to the number of words or pattern groups that comprise the bit pattern. Thus, the number of instructions to accomplish the one-bit rotate is proportional to the number of bits to be rotated divided by the shift operand length, which is usually the word length of the shift registers in the CPU.

SUMMARY OF THE INVENTION

Therefore, the problem remaining in the prior art is to provide a method and system for rotating or shifting a bit pattern, utilizing a substantially fixed number of instructions, wherein such a bit pattern may be several times the length of a shift register which may perform a rotate or shift operation in response to a single instruction.

It is therefore one object of the present invention to provide a method and system for manipulating a long bit pattern.

It is another object of the present invention to provide a method and system of transforming a long bit pattern into a matrix having rows and columns of bits.

It is yet another object of the present invention relates to transforming a long bit pattern into a matrix having rows and columns of bits and manipulating such a matrix to perform the equivalent of a rotate operation on such a long bit pattern.

The foregoing objects are achieved as is now described. A method and system are disclosed in a data processing system for efficiently rotating a linear bit pattern, wherein the data processing system includes means for efficiently performing a rotate operation on a portion of the linear bit pattern, where such a portion has a selected number of bits. The linear bit pattern is divided into a plurality of pattern groups, where each of such pattern groups has a number of bits equal to a group length. Thereafter, a matrix of bits is formed. Such a matrix has groups of bits along a plurality of rows and columns, wherein each row contains a number of bits equal to a shift operand length, and each column contains a number of bits equal to the group length. Bits in a selected row are rotated. Thereafter, each row, as a group of bits, is rotated such that bits in each column remain in the same column. After manipulating the matrix, the contents of the matrix represents the linear bit pattern rotated by one bit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 graphically depicts the manipulation of matrices in accordance with the method and system of the present invention;

FIG. 12 depicts C-language code for performing a 1-bit left long rotate in accordance with the method and system of the present invention;

FIG. 13 depicts matrices with corresponding index words in accordance with the method and system of the present invention;

FIG. 14 depicts a C-language subroutine for performing a logical AND operation between two AND-indexed matrices, in accordance with the method and system of the present invention; and FIG. 15 is an example of C-language code for implementing an optimized rotate operation utilizing an index word in accordance with the method and system of the present invention.

DETAILED DESCRIPTION OF PREFERRED EMBODIMENT

Figure 4:
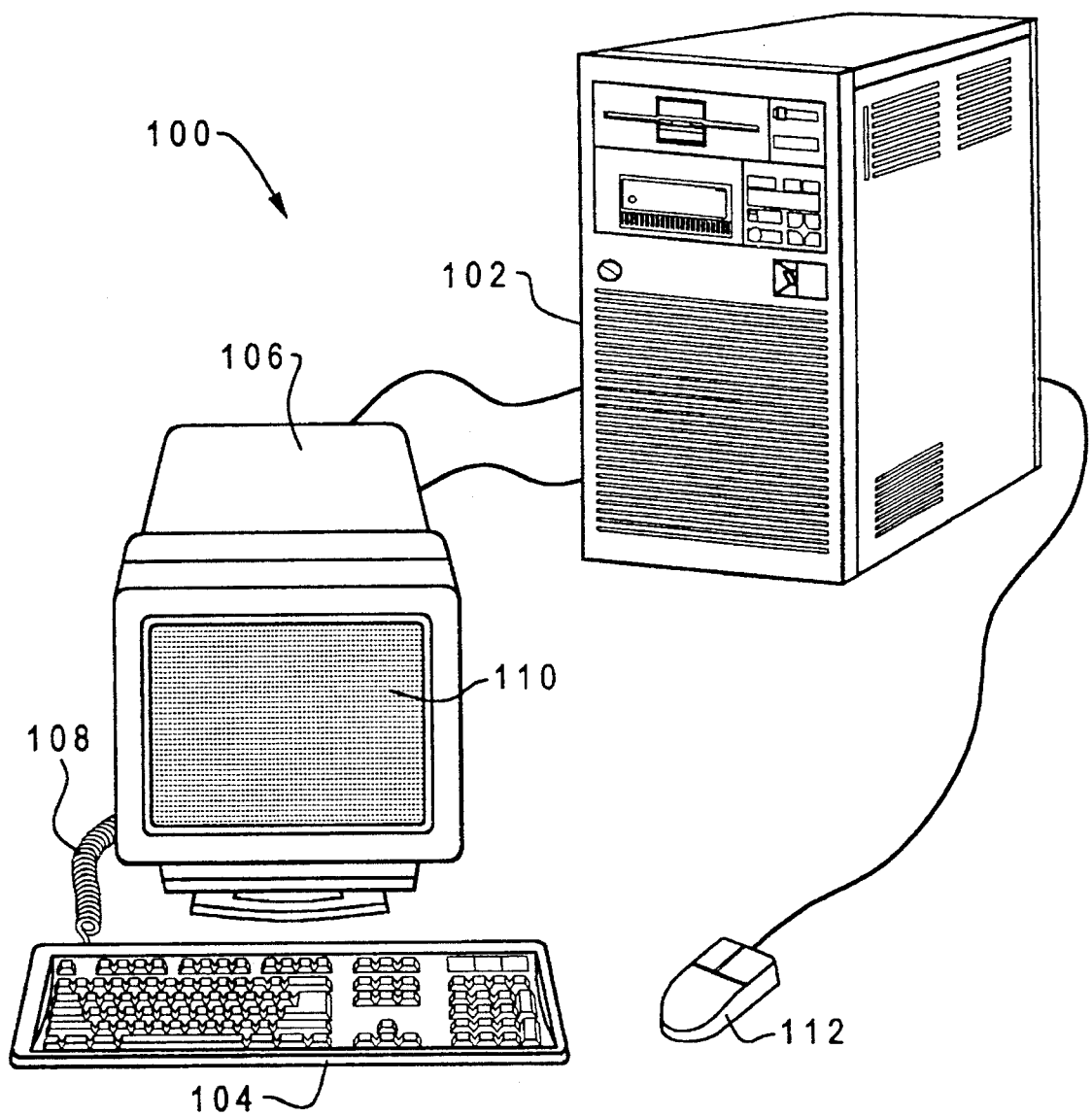
FIG. 4 illustrates a data processing system which may be utilized to implement the method and system of the present invention.

With reference now to the figures, and in particular with reference to FIG. 4, there is depicted a data processing system 100, which includes processor 102, keyboard 104, and display 106. Keyboard 104 is coupled to processor 102 via cable 108. Display 106 includes display screen 110, which may be implemented utilizing a cathode ray tube (CRT), a liquid crystal display (LCD), an electroluminescent panel, or the like. Data processing system 100 also includes pointing device 112, which may be implemented utilizing a trackball, joystick, touch sensitive tablet or screen, or, as illustrated in FIG. 4, a mouse. Pointing device 112 may be utilized to move a pointer or cursor on display screen 110.

Those persons skilled in the art of data processing system design will recognize that display 106, keyboard 104, and pointing device 112 may each be implemented utilizing any one of several known off-the-shelf components. For example, data processing system 100 may be implemented utilizing any so-called "personal computers," such as the personal computer sold under the trademark "PS/2" by International Business Machines Corporation (IBM), of Armonk, N.Y.

Figure 5:
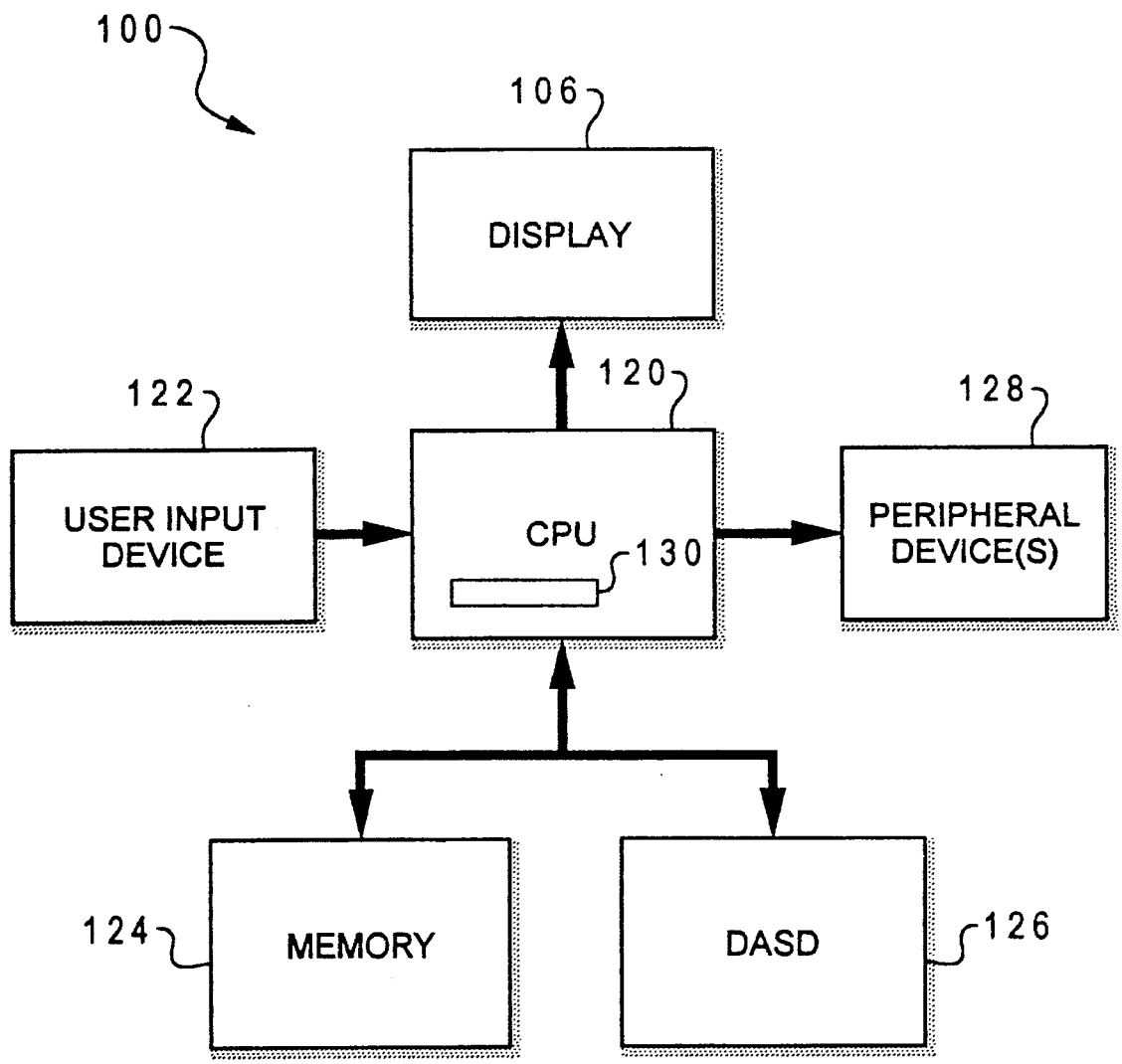
FIG. 5 depicts a more detailed high-level block diagram which further illustrates the major components of the data processing system in FIG. 4.

With reference now to FIG. 5, there is depicted a more detailed high-level block diagram which further illustrates the major components of data processing system 100 of FIG. 4. Data processing system 100 is controlled primarily by instructions, in the form of software, executed within central processing unit (CPU) 120. CPU 120 is coupled to display 106, which is utilized to display text and graphics, and possibly animated graphics or video. CPU 120 is also coupled to user input device 122, which is utilized to receive input from a data processing system user. User input device 122 may include keyboard 104 and pointing device 112, as illustrated in FIG. 4. Memory 124 and direct access storage device (DASD) 126 may be utilized for storing application programs (i.e., software) and data sets.

Peripheral devices 128 may also be included in data processing system 100. Peripheral devices 128 may include printers or other output devices, tape drives, CD-ROMs, WORM drives, communications devices, multimedia presentation devices, test equipment, and the like.

According to an important aspect of the present invention, CPU 120 includes one or more registers that are capable of storing a plurality of data bits, wherein such bits may be utilized in an arithmetic or logical operation. Such operations include rotate and shift operations. Register 130 is an example of such a register. Register 130 has a register length which represents the storage capacity, or number of bits that may be stored in the register, which also may be the number of bits that comprises an operand in a shift or rotate operation. Register 130 typically contains 32 or 64 bits, although other register lengths are possible. Thus, those persons skilled in the art should appreciate that the short, 4-bit registers utilized in the examples herein may, in fact, be much longer, depending upon the particular design of CPU 120.

Figures 1, 2, 3:
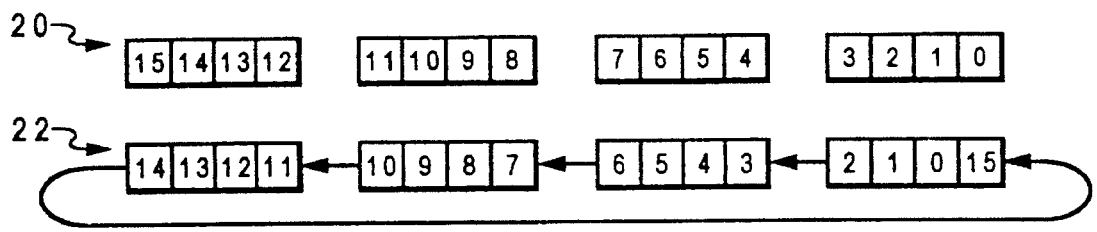
FIG. 1 illustrates a 1-bit rotate left operation performed on a 16-bit bit pattern.
FIG. 2 depicts the conventional steps for executing a 1-bit left rotate on a 16-bit bit pattern which is composed of four 4-bit words.
FIG. 3 depicts a sequence of C-language instructions which may perform the 1-bit left rotate as illustrated in FIGS. 1 and 2.

Since the CPU handles data most efficiently in portions (i.e., number of bits) equal to the size or length of register 130, one step in the method and system of the present invention is to organize a bit pattern to be shifted or rotated into words that will fill a register such as register 130. The length of register 130 may also be referred to as the "shift operand length," which is the length of an operand that may be efficiently shifted or rotated by the CPU. Therefore, a bit pattern, such as the bit pattern 20 shown in the first row of FIG. 1, is arranged to form a matrix comprised of matrix words, or rows, wherein each row may be efficiently rotated by the CPU. Such a matrix is illustrated at matrix 36 in FIG. 6.

Such matrix words are formed by selecting a particular bit from a group of bits in the bit pattern. For example, in FIG. 7, two linear bit patterns 40 and 42, having two different bit pattern lengths, have been divided into four groups. Bit pattern 40 has sixteen bits, where the "group pattern length" is four. Bit pattern 42 has twenty bits, and the group pattern length is five. The bit pattern length is determined by the particular software application and the particular problem solved by such an application. The group pattern length may be determined by the shift operand length or the register length in the CPU, such as register 130. Thus, if register 130 has a register length of four, bit patterns 40 and 42 may be divided into four groups.

Figure 6:
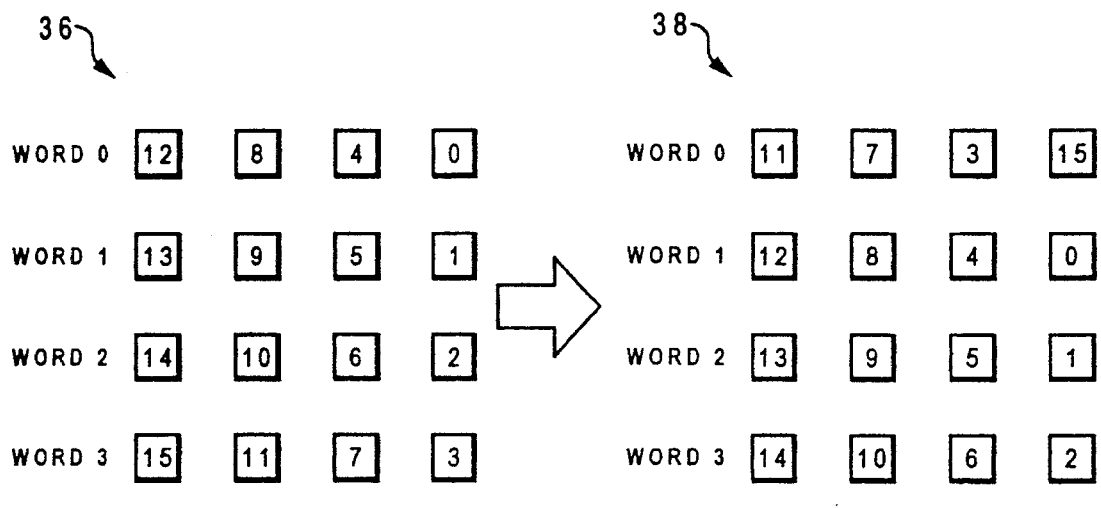
FIG. 6 illustrates a matrix comprised of matrix words, or rows, in accordance with the method and system of the present invention.
Figure 7:
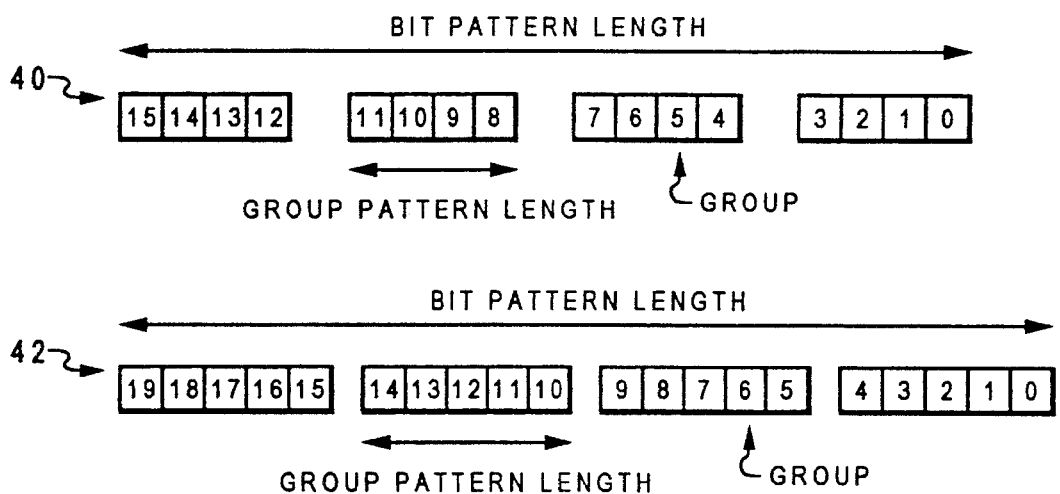
FIG. 7 depicts two linear bit patterns which have been divided into four pattern groups in accordance with the method and system of the present invention.

With reference again to FIG. 6, one may observe that WORD 0 in matrix 36 is formed by selecting the first bit (i.e., the rightmost bit) from each of the four groups in bit pattern 40 of FIG. 7. In a similar manner, WORD 1 is comprised of bits taken from the second bit location from the right in each of the four groups. WORDs 2 and 3 of matrix 36 are formed in a similar manner.

In order to form matrix 36 by the method discussed above, all the bits in the bit pattern must be known. In some applications, however, bits in the bit pattern are shifted into the bit pattern one bit at a time. If this is the case, matrix 36 may be formed a column at a time instead of being formed a row at a time. For example, as the bits in the bit pattern are received, bit zero is placed on the first row in the rightmost column, followed by bit one in the next row in the rightmost column, and so forth until the matrix is filled, and words zero through three are formed. In data communication applications where data compression is utilized, this may be the preferred mode of placing a bit pattern into the matrix form.

The reader should notice that if bit pattern 22 of FIG. 1 were placed in matrix form in a manner similar to that which formed matrix 36 in FIG. 6, matrix 38 would be the result. In other words, it should be understood that a matrix may be disassembled, to form a linear bit pattern, and that when matrix 38 is disassembled, bit pattern 22 of Figure I is the result. Therefore, steps utilized to manipulate matrix 36 into matrix 38 may be utilized to rotate bit pattern 20 to produce bit pattern 22.

With reference now to FIG. 8, there is graphically depicted the difference between matrix 36 and matrix 38. As illustrated by the arrows, WORD 0 has been moved to the previous location of WORD 1, WORD 1 has been moved to the previous location of WORD 2, and WORD 2 has been moved to the previous location of WORD 3. WORD 3 has been moved to the previous location of WORD 0, and, in addition, rotated one bit to the left. Therefore, by conducting the manipulations illustrated by the arrows, matrix 36 may be transformed into matrix 38, where matrix 38 is a representation of a linear bit pattern (i.e., bit pattern 22) which has been rotated one bit to the left.

Yet, another way to form matrix 36 is to begin with a "clear" matrix (i.e., all bits of the matrix are set to zero), and thereafter shift- or rotate-in a new bit as the matrix is manipulated as shown in FIG. 8. Thus, a new bit to be rotated into the matrix may be placed in the CARRY bit, and rotated into the least significant bit location of WORD 3 while the most significant bit of WORD 3 is shifted- or rotated-out of WORD 3. In this manner, the entire matrix may be loaded one bit at a time by performing the matrix manipulations shown in FIG. 8.

Although in FIG. 8 the matrix words are shown to be moved from one word location to another word location, in software, such movement of the matrix words may be accomplished by the use of a base pointer or an offset pointer, such that after shifting, logical word N may be referenced as physical word ((N+base pointer) Modulo NWORDS).

Figure 9:
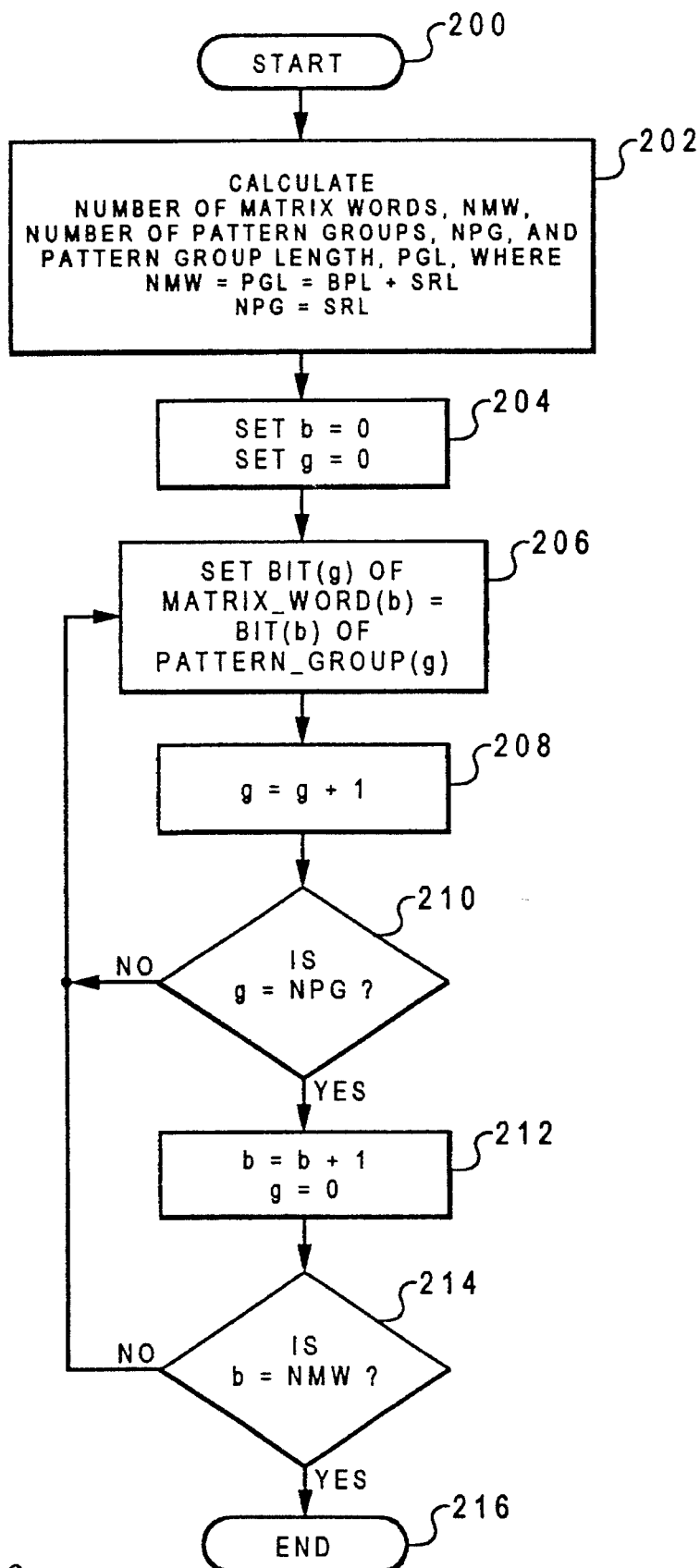
FIG. 9 is a high-level flow chart which illustrates the process of forming a matrix according to the method and system of the present invention.

With reference now to FIG. 9, there is depicted a high-level flowchart which illustrates the process of setting up a matrix according to the method and system of the present invention. As illustrated, the process begins at block 200 and thereafter passes to block 202. Block 202 illustrates the process of calculating the "number of matrix words," the "number of pattern groups," and the "pattern group length." The number of matrix words and the number of pattern groups is calculated by the formula:

$$NMW=PGL=BPL+SOL$$

where

NMW=number of matrix words

PGL=pattern group length

BPL=bit pattern length, and

SOL=shift operand length.

The number of pattern groups (NPG) is equal to the shift operand length (SOL). The shift operand length may be equal to the number of bits in a register which may be rotated by a rotate instruction within the CPU. An example of such a register is register 130.

Next, the variables "b" and "g" are initialized by setting them to 0, as depicted at block 204. Thereafter, the matrix is built bit-by-bit by setting BIT(g) of MATRIX_WORD(b) equal to BIT(b) of PATTERN_GROUP(g), as illustrated at block 206.

As depicted at block 208, the variable "g" is incremented so that the same bit location from the next group pattern will be selected once the process returns to block 206.

Next, the process determines whether or not "g" is equal to the number of pattern groups (NPG). If "g" is not equal to NPG there are more groups from which to select a bit, and the process returns to block 206 via the NO branch from block 210. If "g" is equal to NPG, the process increments the variable "b" and sets "g" equal to 0, as illustrated at block 212. By incrementing "b" the process selects the next bit location from each pattern group once the process returns to block 206.

Next, the process determines whether or not "b" is equal to the number of matrix words (NMW), as illustrated at block 214. If "b" is not equal to NMW, the process returns to block 206 to select the bits in the next matrix word. If "b" is equal to NMW, the process terminates as depicted at block 216.

While the flowchart of FIG. 9 discloses building the matrix one row at a time, the matrix may be constructed one column at a time by placing bits in the rightmost group of the bit pattern in the rightmost column of the matrix. Assembling the matrix by columns may be the preferred embodiment for applications where the bit pattern is not known before hand and where the bit pattern is assembled by receiving one bit at a time.

Figure 10:
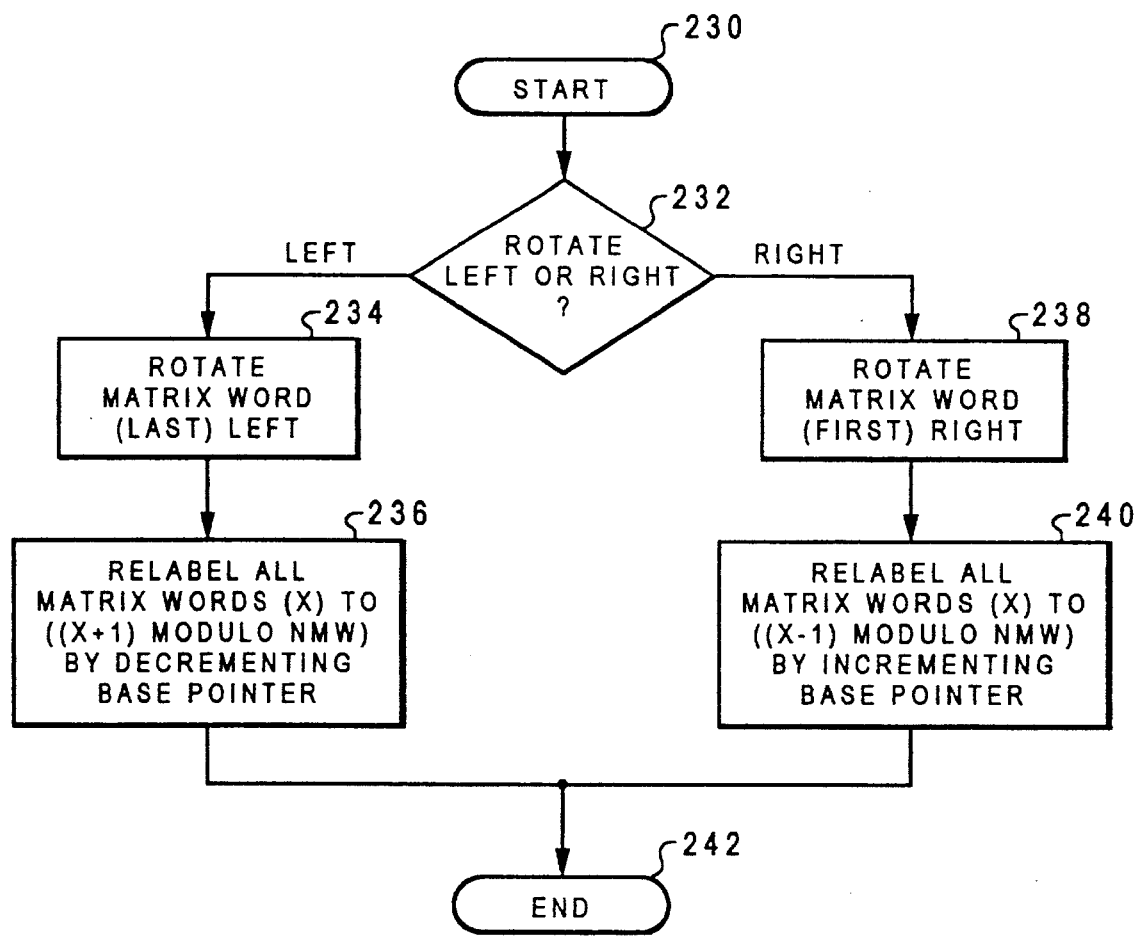
FIG. 10 is a high-level flow chart which illustrates the process of manipulating or transforming a matrix in a manner that corresponds to a 1-bit rotate left or right, in accordance with the method and system of the present invention.

With reference now to FIG. 10, there is depicted a high-level flowchart illustrating the process of transforming a matrix in a manner that corresponds to a one-bit rotate left or right, in accordance with the method and system of the present invention. As illustrated, the process begins at block 230 and thereafter passes to block 232. At block 232, the process determines whether a rotate left or a rotate right has been requested by software instruction. If a rotate left operation will be performed, the process rotates the last or lowermost matrix word (i.e., the matrix word comprised of the most significant bits from each group pattern) to the left by one bit, as depicted at block 234. Thereafter, the process performs a vertical matrix word rotation where all matrix words are moved down one matrix word, except for the last matrix word, which is moved to the top of the matrix, as illustrated at block 236. This vertical rotation process is illustrated in FIG. 8. Although the process of vertically rotating matrix words is described and illustrated as copying a word from one storage location and storing that word into another storage location, such a process of vertical rotation may be accomplished utilizing a base pointer, or offset. For example, what was initially WORD 0, becomes WORD ((N+bp) Modulo NWORDS) where bp is the base pointer.

Referring again to block 232, if a rotate right operation will be performed, the process rotates the first matrix word (i.e., the matrix word comprised of the least significant bits from each pattern group to the right by one bit, as depicted at block 238. Thereafter, the process moves all matrix words up one matrix word, except for the first matrix word, which is moved to the bottom of the matrix, as illustrated at block 240. A similar process is illustrated in FIG. 8. As discussed above, the process of vertically rotating matrix words may be accomplished by decrementing a base pointer.

Thereafter, such a process of transforming a matrix in a manner that corresponds to a one bit rotate left or right ends, as depicted at block 242.

Figure 11:
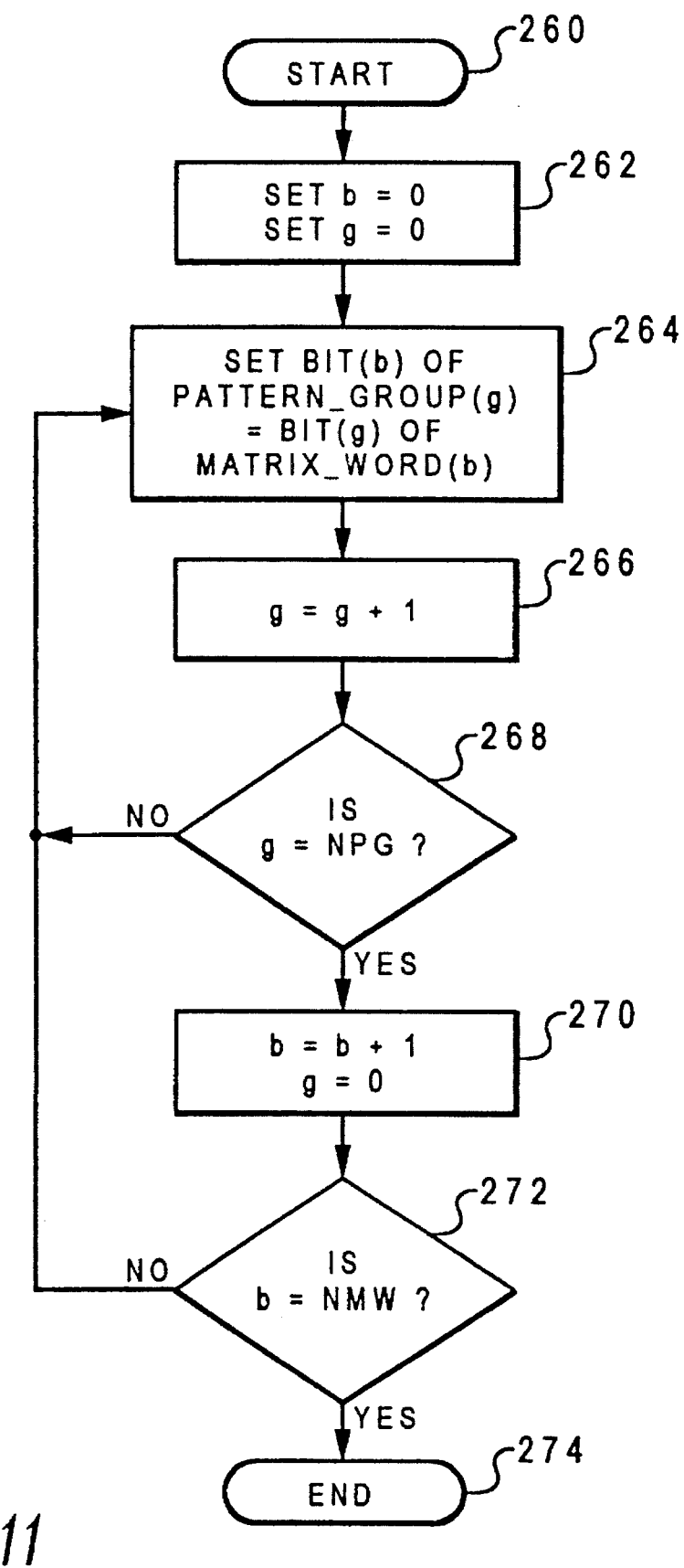
FIG. 11 is a high-level flow chart which illustrates the process of disassembling a matrix to produce a linear bit pattern in accordance with the method and system of the present invention.

Referring now to FIG. 11, there is depicted a high-level flowchart illustrating the process of disassembling a matrix to produce a linear bit pattern in accordance with the method and system of the present invention. As illustrated, the process begins at block 260 and thereafter passes to block 262. Block 262 illustrates the process of initializing variables "b" and "g" by setting them to zero. Thereafter, the matrix is disassembled bit-by-bit by setting BIT(b) of PATTERN_GROUP(g) equal to BIT(g) of MATRIX_WORD(b), as illustrated at block 264.

As depicted at block 266, the variable (g) is incremented so that the same bit location from the next matrix word will be selected once the process returns to block 264.

Next, the process determines whether or not "g" is equal to the number of pattern groups. If "g" is not equal to NPG there are more matrix words from which to select a bit, so the process returns to block 264 via the NO branch from block 268. If "g" is equal to NPG, the process increments the variable "b" and sets "g" equal to zero, as illustrated at block 270. By incrementing "b" the process selects the next bit location from each matrix word once the process returns to block 264.

Next, the process determines whether or not "b" is equal to the number of matrix words, as depicted at block 272. If "b" is not equal to NMW, the process returns to block 264 to select bits for the next pattern group. If "b" is equal to NMW, the process terminates as illustrated at block 274.

With reference now to FIG. 12, there is depicted C-language code for performing a one-bit left long rotate.

Logical Operations Between Two-Dimensional Bit Matrices

Once a linear bit pattern has been placed in such a two-dimensional matrix format, logical operations may be performed utilizing such matrices as operands. Consider the case where the machine or CPU word width is 32-bits, and the bit pattern length is 1024-bits. For each 32×32 matrix formed from such a bit pattern, a 32-bit index word may be created. In such an index word, each bit may represent whether or not at least one bit in a corresponding matrix word is set. Such an index word need not be completely recreated after the matrix is "rotated," because all bits which are set in a matrix word remain within the same matrix word. Thus, index words may be ANDed together to find the indices which indicate the corresponding matrix words in two matrices which have bits set. Such indices indicate which matrix words need to be ANDed together to obtain the result of the AND operation between two matrices. For matrices with sparse bit patterns, first ANDing the index words together to determine which matrix words must be ANDed together may make such a matrix AND operation an order of magnitude faster.

If the bit pattern in the example above is larger than 1024 bits, the index word associated with such a matrix may be larger than the machine or CPU word width, which creates the problem of having an index word which may be longer than the CPU is able to rotate, or utilize in other Boolean operations. If this is the case, the index word, which is merely a long bit pattern, may also be placed in matrix form, and such a matrix formed from the index word may have its own index word. Thus, a matrix may represent an index word for yet a larger matrix.

A corresponding index scheme for a matrix OR operation utilizes index words where a "1" indicates that all bits in the matrix word are "1," and a "0" indicates that at least one bit in the corresponding matrix word is a "zero." When the index words are ORed together first, only matrix words corresponding to "0" bits in the resulting index word need to be ORed together to obtain the result of a matrix OR operation.

With reference now to FIG. 13, there is depicted two matrices with corresponding index words in accordance with the method and system of the present invention. Index word 50 is derived from matrix 52, and index word 54 is derived from matrix 56. Index word 50 is utilized in conducting AND operations, and therefore bits in index word 50 are set to one to indicate that at least one bit in a corresponding matrix word is set to one. Index word 54 is utilized in OR operations, and therefore bits in index word 54 are set to one to indicate that all bits in a corresponding matrix word are equal to one.

An example of C-language code for implementing a logical AND between AND-indexed matrices is depicted in FIG. 14.

Further reduction of shift overhead using an index word

If an index word is maintained so that it corresponds to a matrix, the index word may be rotated each time a rotate operation is performed on the matrix. During the matrix rotate, a specific bit of the index word may indicate that all bits of the matrix word which will be rotated are the same (all zeros for an AND index, and all ones for an OR index). If all bits in the matrix word are the same, the rotate operation on the matrix word is unnecessary. Eliminating the matrix word rotate saves the time to perform the rotate operation, and the time required to load and store the matrix word, which generally takes several machine cycles.

An example of C-language code for implementing such an optimized rotate operation is illustrated in FIG. 15.

Applications

Ordinary addition, subtraction, multiplication, and division between matrices is inefficient, because arithmetic logic unit (ALU) logic cannot handle the movement of data between adjacent bits (e.g., CARRY) within a single machine cycle. Single bit shifting of matrices is vastly more efficient, and bit wise logic operations between matrices, such as AND and OR operations, can be somewhat more efficient than with linear shift registers. In many applications, the programmer does not want to propagate CARRY information, or other information, between adjacent bits, because the bits represent incommensurable quantities. Two specific application areas most suited for the utilization of the present invention include applications where the bit stream represents temporal or spatial sequence of binary data which will be searched within a pattern recognition algorithm, and applications where the bit pattern represents the binary coefficients of a polynomial mod 2 as explained below.

Pattern search within data sequences: sliding window data compression

In software implementations of LZ (Lempel-Ziv) data compression, a sliding history window is compared to an incoming data stream. In such compression, bit patterns are utilized to represent character and string occurrences. Shifting and ANDing together such bit patterns permit parallel history match evaluation. In such an application, the need arises to execute a 1-bit long rotate on the string occurrence history bit pattern.

Bit series representing binary coefficient polynomials: generation of nonrepeating/quasirandom bit sequences Shift registers with feedback are used, in both hardware and software, to rapidly generate quasirandom bit sequences. In software, such algorithms are utilized to emulate hardware. Such algorithms are utilized because they are much faster than some other random number generators which typically utilize slow multiply and divide instructions, and data shuffling. Such quasirandom sequences are used in cipher and signature generation, real-time signal processing, spread spectrum communications, and Monte Carlo modeling. For more information concerning such applications, see *Numerical Recipes in C: the Art of Scientific Computing-2nd Ed.* by William H. Press et al., published by Cambridge University Press, 1988, 1992, §§ 7.4, 7.7.

Generation of Cyclic Redundancy Checks CRC's with high order generating polynomials Primitive polynomial algebra modulo 2 underlies the generation of CRCs. The generation of CRCs is equivalent to calculating the remainder of a division operation between the incoming bit stream, considered as a polynomial, divided by a reference polynomial. CRCs have important mathematically provable ability to detect and/or correct more severe transmission errors within longer streams of data as the length of their generating polynomial increases. For instance, CRCs can reliably detect burst errors in a bit stream having a length which is less than the generating polynomial degree (shift register length) r (see *Design and Validation of Computer Protocols* by G. Holzmann, Prentice-Hall, 1991, pp. 56–63) and all double-bit errors in a bit stream of up to $2^r$ bits (see *Computer Networks* by A. Tannenbaum, Prentice-Hall, 1988, pp. 209–212). For instance, the CRC used in Ethernet protocol is capable of detecting any double-bit error in an ethernet packet comprising approximately 1 k bytes, because of the length of its generating polynomial. As more data is moved in larger packets, a need for calculation of CRCs based on longer generating polynomials will increase.

In summary, the method and system of the present invention allows single-bit long shifts to be performed in a relatively constant period of time, independent of the number of bits shifted. Thus, the software overhead for long shift operations may be effectively reduced to zero. Additionally, an index word may be utilized to increase the speed of bitwise logic operations (e.g., AND, OR, XOR, etc.) between matrices.

While the present invention has been described in terms of columns and rows of bits which form a matrix, those persons skilled in the art should recognize that the terms "row" and "column" are relative terms, and, therefore, from another prospective, rows may be considered columns and columns may be considered rows.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system for efficiently rotating a linear bit pattern, wherein said data processing system includes means for efficiently performing a rotate operation on a portion of said linear bit pattern having a selected number of bits, said method comprising the computer implemented steps of:

dividing said linear bit pattern into a plurality of pattern groups, each of said pattern groups having a number of bits equal to a group length;

forming a matrix of bits having groups of bits along a plurality of rows and groups of bits along a plurality of columns, wherein each of said plurality of rows contains a number of bits equal to said selected number of bits, and wherein each of said plurality of columns contains a number of bits equal to said group length, and wherein each of said columns is comprised of bits in one of said pattern groups, and wherein said data processing system may efficiently perform a rotate operation on a group of bits in one of said plurality of rows;

rotating bits in a selected one of said plurality of rows of said matrix; and rotating as a group, each of said groups of bits in each of said plurality of rows, wherein each of said bits in each of said plurality of rows is rotated to a different row, and wherein each of said bits in each of said plurality of columns remains in the same column, wherein, after said rotating steps, the contents of said matrix represents said linear bit pattern rotated by one bit.

2. The method in a data processing system for efficiently rotating a linear bit pattern according to claim 1 wherein said group length is equal to (GL), and each of said rows has an address equal to a row number plus an offset pointer (P), and wherein said step of rotating as a group, each of said groups of bits in each of said plurality of rows includes incrementing said offset pointer (P) by the formula ((P±1) MODULO (GL)).

3. The method in a data processing system for efficiently rotating a linear bit pattern according to claim 1 wherein said step of rotating bits in a selected one of said plurality of rows of said matrix includes rotating bits in a lowermost row of said matrix one bit to the left if said bit pattern is to be rotated one bit to the left.

4. The method in a data processing system for efficiently rotating a linear bit pattern according to claim 1 wherein said step of rotating bits in a selected one of said plurality of rows of said matrix includes rotating bits in a uppermost row of said matrix one bit to the right if said bit pattern is to be rotated one bit to the right.

5. The method in a data processing system for efficiently rotating a linear bit pattern according to claim 1 wherein said step of rotating as a group, each of said groups of bits in each of said plurality of rows includes rotating each of said groups of bits in each of said plurality of rows in a downward direction if said bit pattern is to be rotated one bit to the left.

6. The method in a data processing system for efficiently rotating a linear bit pattern according to claim 1 wherein said step of rotating as a group, each of said groups of bits in each of said plurality of rows includes rotating each of said groups of bits in each of said plurality of rows in a upward direction if said bit pattern is to be rotated one bit to the right.

7. The method in a data processing system for efficiently rotating a linear bit pattern according to claim 1 further including the step of:

creating an index word having a plurality of bits, wherein each of said groups of bits in said rows in said matrix is associated with at least one of said plurality of bits, wherein each of said plurality of bits is associated with only one of said groups of bits in said rows, wherein each of said plurality of bits is set to a one or a zero in response to said bits in said associated row of said matrix.

8. The method in a data processing system for efficiently rotating a linear bit pattern according to claim 7 wherein the step of creating an index word having a plurality of bits includes creating an index word having a plurality of bits, wherein each of said groups of bits in said rows in said matrix is associated with at least one of said plurality of bits, wherein each of said plurality of bits is associated with only one of said groups of bits in said rows, and wherein each of said plurality of bits is set to zero if said bits in said associated row are all equal to zero, and set to one if at least one of said bits in said associated row of said matrix is equal to one.

9. The method in a data processing system for efficiently rotating a linear bit pattern according to claim 7 wherein the step of creating an index word having a plurality of bits includes creating an index word having a plurality of bits, wherein each of said groups of bits in said rows in said matrix is associated with at least one of said plurality of bits, wherein each of said plurality of bits is associated with only one of said groups of bits in said rows, and wherein each of said plurality of bits is set to one if said bits in said associated row are all equal to one, and set to zero if at least one of said bits in said associated row of said matrix is equal to zero.

10. A data processing system for efficiently rotating a linear bit pattern, wherein said data processing system includes memory means and means for efficiently performing a rotate operation on a portion of said linear bit pattern having a selected number of bits, said data processing system comprising:

means within said data processing system for dividing said linear bit pattern into a plurality of pattern groups, each of said pattern groups having a number of bits equal to a group length;

forming a matrix of bits within said memory means, said matrix having groups of bits along a plurality of rows and groups of bits along a plurality of columns, wherein each of said plurality of rows contains a number of bits equal to said selected number of bits, and wherein each of said plurality of columns contains a number of bits equal to said group length, and wherein each of said columns is comprised of bits in one of said pattern groups, and wherein said data processing system may efficiently perform a rotate operation on a group of bits in one of said plurality of rows;

means within said data processing system for rotating bits in a selected one of said plurality of rows of said matrix; and means within said data processing system for rotating, as a group, each of said groups of bits in each of said plurality of rows, wherein each of said bits in each of said plurality of rows is rotated to a different row, and wherein each of said bits in each of said plurality of columns remains in the same column, wherein the contents of said matrix may be efficiently manipulated to represent said linear bit pattern rotated by one bit.

11. A method in a data processing system for efficiently rotating a linear bit pattern having a bit pattern length, wherein said data processing system includes means for performing a rotate operation on a portion of said linear bit pattern having a shift operand length (SOL), said method comprising the computer implemented steps of:

dividing said bit pattern length by said shift operand length (SOL) to calculate a pattern group length (PGL);

subdividing said bit pattern into a number of bit pattern groups (BPG(g)) equal to (SOL), where g is an integer from zero to (SOL−1), and wherein bits within each of said bit pattern groups have an address (GB(y)), where y is an integer from zero to (PGL−1), and wherein (GB(0)) is the rightmost bit;

forming a matrix of bits having a number of rows equal to (PGL), wherein each row is comprised of a matrix word (MW(y)), wherein y is an integer from zero to (PGL−1) and (MW(0)) comprises a topmost row, and wherein said matrix words have a length of (SOL) bits, and wherein bits within said matrix words have an address (WB(x)), where x is an integer from zero to (SOL−1), and wherein bit WB(x) of matrix word (MW(y)) is equal to bit (GB(y)) in bit pattern group (BPG(x));

rotating matrix word MW(PGL−1) one bit to the left; and setting each matrix word MW(w) equal to matrix word MW((w+1) mod PGL), wherein said matrix represents a rotated bit pattern equal to said bit pattern rotated one bit to the left.

12. A method in a data processing system for efficiently rotating a linear bit pattern having a bit pattern length, wherein said data processing system includes means for performing a rotate operation on a portion of said linear bit pattern having a shift operand length (SOL), said method comprising the computer implemented steps of:

dividing said bit pattern length by said shift operand length (SOL) to calculate a pattern group length (PGL);

subdividing said bit pattern into a number of bit pattern groups (BPG(g)) equal to (SOL), where g is an integer from zero to (SOL−1), and wherein bits within each of said bit pattern groups have an address (GB(y)), where y is an integer from zero to (PGL−1), and wherein (GB(0)) is the rightmost bit;

forming a matrix of bits having a number of rows equal to (PGL), wherein each row is comprised of a matrix word (MW(y)), wherein y is an integer from zero to (PGL−1) and (MW(0)) comprises a topmost row, and wherein said matrix words have a length of (SOL) bits, and wherein bits within said matrix words have an address (WB(x)), where x is an integer from zero to (SOL−1), and wherein bit WB(x) of matrix word (MW(y)) is equal to bit (GB(y)) in bit pattern group (BPG(x));

rotating matrix word MW(PGL−1) one bit to the right; and setting each matrix word MW(w) equal to matrix word MW((w−1) mod PGL), wherein said matrix represents a rotated bit pattern equal to said bit pattern rotated one bit to the right.

* * * * *